1,498,940

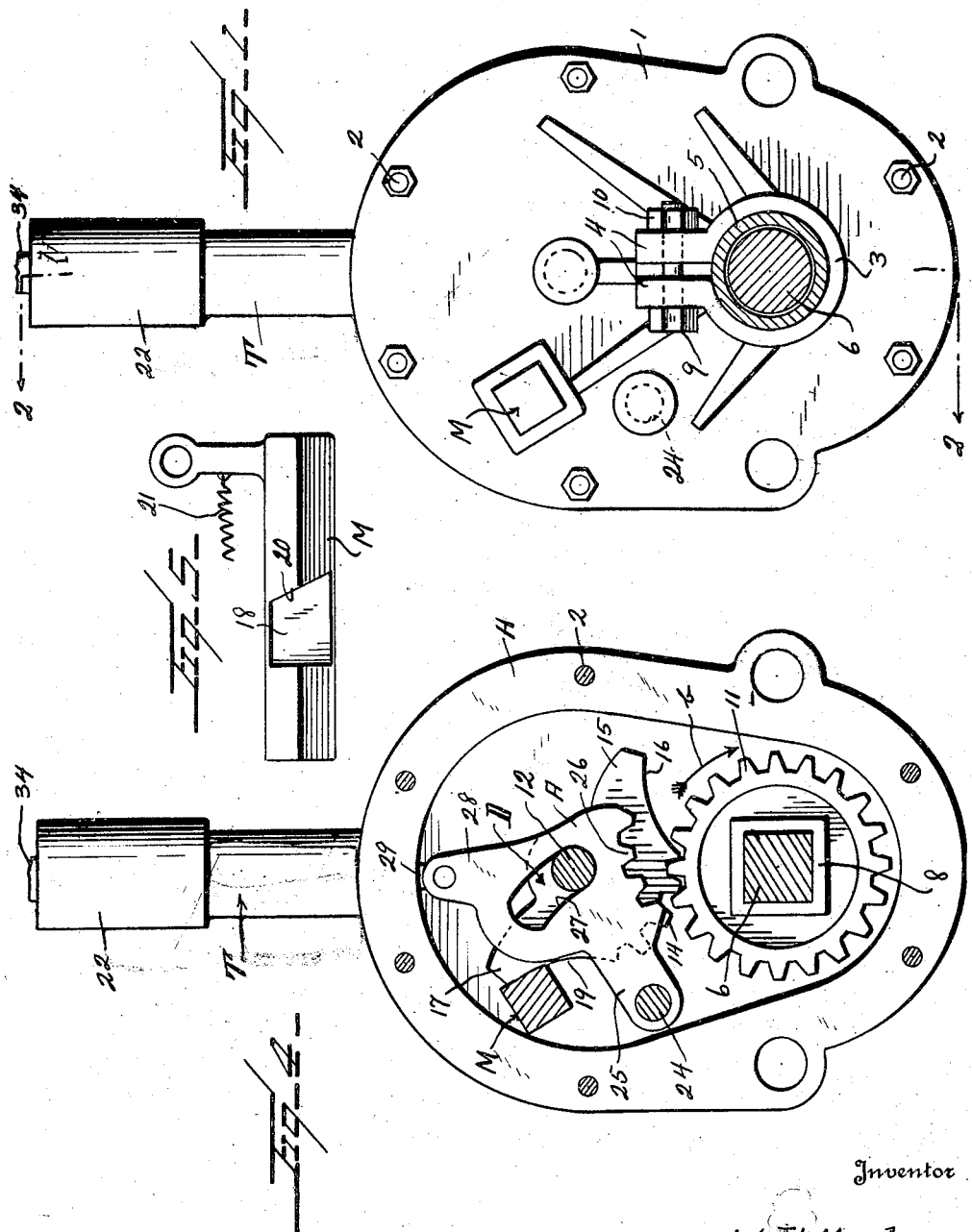

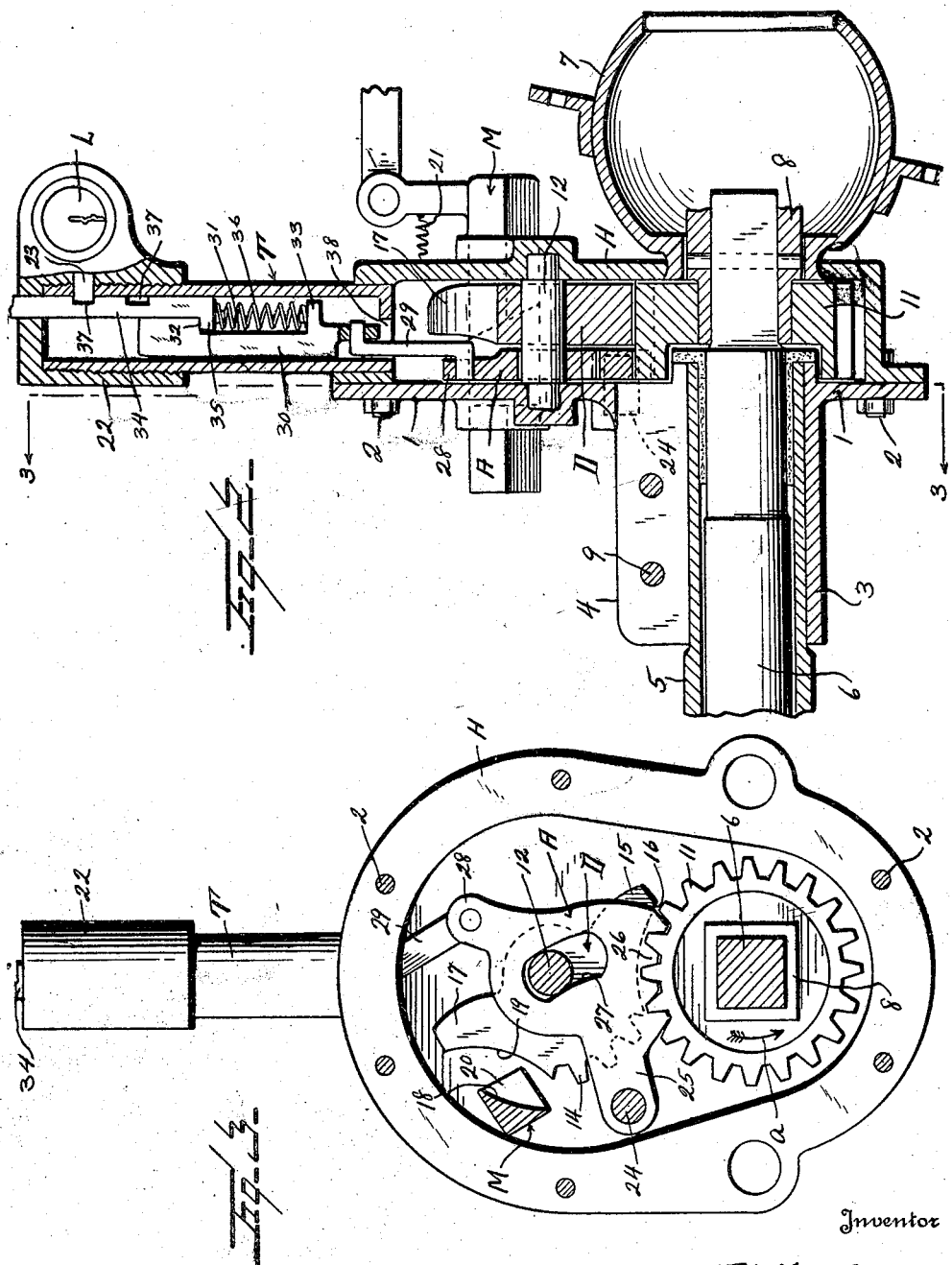
June 24, 1924.
W. I. WHEELER
SAFETY DEVICE FOR VEHICLES
Filed Jan. 29, 1923
1,498,940
2 Sheets-Sheet 2
Inventor
W. I. Wheeler
By Watson E. Coleman
Attorney Patented June 24, 1924.

UNITED STATES PATENT OFFICE.

WILLIAM ISIAH WHEELER, OF SCOTTVILLE, ILLINOIS.

SAFETY DEVICE FOR VEHICLES.

Application filed January 29, 1923. Serial No. 615,664.

*To all whom it may concern:*

Be it known that I, WILLIAM ISIAH WHEELER, a citizen of the United States, residing at Scottville, in the county of Macoupin and State of Illinois, have invented certain new and useful Improvements in Safety Devices for Vehicles, of which the following is a specification, reference being had to the accompanying drawings.

This invention relates to certain improvements in safety devices for vehicles and it is an object of the invention to provide a novel and improved device of this general character to prevent backward movement of the vehicle.

It is also an object of the invention to provide a device of this general character having novel and improved means whereby to lock the vehicle against forward movement and thereby providing an effective medium against theft.

An additional object of the invention is to provide a novel and improved device of this general character coacting with a rotatable member comprised in the driving means of a vehicle to hold said vehicle against movement, said means having a mechanism associated therewith to render the same inoperative.

Furthermore it is an object of the invention to provide a novel and improved device of this general character which is adapted for use in connection with a rotary member and which normally operates to hold said member against rotation in one direction together with means whereby the rotary member may be held or locked against rotation in either direction.

The invention consists in the details of construction and in the combination and arrangement of the several parts of my improved safety device for vehicles whereby certain important advantages are attained and the device rendered simpler, less expensive and otherwise more convenient and advantageous for use, as will be hereinafter more fully set forth.

The novel features of my invention will hereinafter be more definitely claimed.

In order that my invention may be the better understood, I will now proceed to describe the same with reference to the accompanying drawings, wherein:—

Figure 1 is a view partly in elevation and partly in section illustrating a safety device constructed in accordance with an embodiment of my invention;

Figure 2 is a sectional view taken substantially on the line 2—2 of Figure 1;

Figure 3 is a sectional view taken substantially on the line 3—3 of Figure 2;

Figure 4 is a view similar to Figure 3 showing certain of the parts in a second position;

Figure 5 is an elevational view of the stop member as herein disclosed.

As disclosed in the accompanying drawings, H denotes a housing of desired dimensions, one face of which constituting a removable plate 1 held in applied position as at 2 by coacting nuts and bolts or the like. The plate 1 is provided with an outstanding split sleeve 3 the opposed edges of which being defined by the outstanding flanges 4. Insertable within the sleeve 3 is an end portion of the drive shaft tube 5. Extending through the tube 5 is the drive shaft 6, said shaft 6 extending through the housing H and within the joint housing 7 of a well known type. Secured to the inner end of the shaft 6 is the female universal joint knuckle 8 illustrated in practice in Figure 2. The housing 7 is carried by the housing H.

Associated with the flanges 4 are the coacting bolts 9 and nuts 10 whereby the sleeve 3 is caused to effectively maintain the desired connection.

The knuckle 8 is keyed to the shaft 6 and has a portion extending within the housing H and fixed to said portion within the housing H for rotation with the shaft 6 is a gear wheel 11.

Arranged within the housing H and supported by the side or face plates thereof is a shaft or stud 12 which provides a mounting for the dog D. The working end of the dog D is formed into a toothed segment 14 for engagement with the gear 11. The dog D is also provided with an extension or tail 15, the inner edge of which is arcuately disposed as at 16 so that when the gear 11 is rotating in its normal direction, as indicated by the arrow *a* in Figure 3, the dog D or more particularly the extension or tail 15 thereof will offer no obstruction to such rotation of the gear 11. Upon retrograde or reverse rotation of the gear 11, as indicated by the arrow *b* in Figure 4, the dog D will swing downwardly by gravity to effect the desired mesh between the segmental gear 14 and the gear 11. This swinging movement of the dog D brings a second or upstanding extension or tail 17 into contact with a stop member M, whereby the gear 11 is effectively locked or held against such reverse rotation. The member M extends through the housing H and is slidably supported by the side or face plates thereof.

The member M is moved endwise a distance sufficient to bring the notch or recess 18 in the path of travel of the extension or tail 17, said extension or tail 17 freely passing through said notch or recess 18 whereby the dog D will be rotated in a requisite direction sufficiently to disengage the gear 14 from the gear 11. In order to prevent the extension or tail 17 of the dog D, when the dog is in its last named position, offering hindrance or obstruction to the gear 11 the inner edge of said extension or tail 17 is arcuately disposed as at 19.

The member M as herein disclosed is adapted to be operatively connected with a reverse pedal, such as any Ford type of transmission or with a reversing lever of other types, such connections serving to move the member M in the desired direction to bring said notch or recess 18 into the path of travel of the extension or tail 17 when the pedal or lever is operated to throw the transmission in reverse.

One end wall as 20 constitutes a cam face, said wall being obliquely disposed with respect to the longitudinal axis of the member M.

After the extension or tail 17 has passed through the recess or notch 18 the member M is returned to its normal position or to a position with the cam end 20 of the notch or recess 18 overlying the outer or free end portion of the extension or tail 17 so that when the gear 11 is rotated in its normal or forward direction the segment 14 will again mesh with the gear 11 and the tail or extension 17 caused to swing upwardly. During this upward swinging movement the outer or free end portion of the extension or tail 17 contacts with the cam wall or face 20 and causes the member M to move outwardly to permit the extension or tail 17 to pass upwardly and entirely through the notch or recess 18 and as said tail or extension 17 moves above the member M, said member M will return to its normal position so that should the gear 11 have a tendency to rotate in a reverse or retrograde direction, said tail or extension 17 will have contact with said member M from above as the dog D moves downwardly.

The means for maintaining the member M in its normal position is diagrammatically indicated in Figure 5 by the spring 21. This spring 21 is intended to include the spring associated with a reverse pedal or lever of well known types and for which reason a detailed disclosure is believed to be unnecessary. Extending upwardly from the housing H and in communication therewith is a tubular member T, the upper end of which being closed by the cap 22 carrying the key operated lock mechanism generally indicated at L. This mechanism includes a bolt 23 movable within the upper portion of the member T through a suitable opening produced therein and for a purpose to be hereinafter referred to. It is to be understood that when the cap 22 is applied the bolt 23 is retracted.

Carried by the plate 1 and extending within the housing H is a suitably positioned pin or stud 24 with which is pivotally engaged the extension or tail piece 25 of a second dog A and having its working end portion toothed as at 26, said piece being arcuately arranged and substantially on the same radius as the radius of the gear 8 so that the dog A may engage the teeth of the gear 8 to lock effectively said gear against rotation in either direction. The dog A is provided with a curved slot 27 through which the shaft or stud 12 is directed so that the dog A may have the desired swinging movement toward or from the gear 11 without hindrance or obstruction being offered by the shaft or stud 12.

The dog A is also provided adjacent its outer or free end with an upstanding arm 28 with which is pivotally engaged an end portion of a rigid link 29. The link 29 extends upwardly and within the lower or adjacent end portion of the tube T and is pivotally engaged with the end portion of an elongated member 30 arranged for endwise movement within the tube T. The inner longitudinal marginal portion of the member 30 is cut away as at 31 to provide longitudinally spaced shoulders 32 and 33. The opposite or inner end portion of the member 30 overlaps a second elongated member 34 also having endwise movement within the tube T and extending exteriorly of the tube T through the cap 22. The inner or inserted end portion of the member 34 is provided with a lateral lug 35 which extends within the cut out portion 31 of the member 30 whereby the members 30 and 34 are capable of limited movement one independently of the other. Interposed between the inner or inserted end of the member 34 and the shoulder 33 of the member 30 is an expansible member 36 herein disclosed as a coiled spring and which serves to constantly urge the member 30 in a direction toward the housing H and which movement through the instrumentality of the link 29 causes the dog A to have locking engagement with the gear 8.

The member 34 is provided with a pair of spaced notches or recesses 37 in which the bolt 23 of the lock L is selectively engaged whereby the bolt 23 serves to hold the dog A in either a raised or inoperative position or in a lowered or locking engagement with the gear.

As illustrated in Figures 3 and 4 of the accompanying drawings, the dog A is in locking engagement with the gear 8. When it is desired to move the dog A into inoperative position, as illustrated in Figure 4, the bolt 23 of the lock mechanism is retracted through the instrumentality of the suitable key or the like whereupon pull is imposed upon the member 34 resulting in pull upon the member 30 and desired swinging or lifting movement to the dog A. The bolt 23 is then caused to engage within the inner notch or recess 37 whereby the dog A is held in inoperative position. The operation causes the dog A to operatively engage with the gear 8 reverse to that just described.

In the event the teeth 26 of the dog D, when the dog D is moved to engage the gear 8, should engage with the outer ends of the teeth of the gear 8 the expansible member or spring 36 will permit the requisite independent movement of the member 34 and when the rotation of the gear 8 permits the proper mesh of the teeth 26 with the teeth of the gear 8 the expansible member or spring 36 will automatically impart the requisite movement to the member 30.

When the dog A is in locking engagement with the gear 8, the liability of unauthorized use of a vehicle or the like is materially reduced and thereby minimizing the liability of theft.

It is to be noted that the inner or inserted end of the tube T is partially closed to provide a restricted opening 38 through which the link 29 is inserted.

In the event the tube T should be broken off the chances are that the link 29 will also be broken and the restricted opening 38 will render difficult the possibility of having access to the dog A to move the same into inoperative position and to maintain the dog A in such position.

It will also be understood that my improved device can be used in connection with other rotatable members to normally hold the same against a reverse or retrograde rotation or locked against rotation in either direction.

From the foregoing description it is thought to be obvious that a safety device for vehicles constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. The combination with a rotatable member; of a holding member supported for swinging movement and moving in a direction to engage the rotatable member to hold the same against rotation, said holding member offering no obstruction to the rotation of the first named member in the opposite direction, a member slidable independently of the holding member, said slidable member when in one position coacting with the holding member to maintain the holding member against release from the rotatable member when the rotatable member rotates in one direction, said holding member when the slidable member is in a second position permitting the rotatable member to rotate in the opposite direction.

2. The combination with a rotatable member; of a holding member supported for swinging movement and moving in a direction to engage the rotatable member to hold the same against rotation in one direction, said holding member being provided with an extension, a member supported for sliding movement and with which the extension of the holding member contacts to maintain the holding member in engagement with the rotatable member, said slidable member being provided with a recess, a second position of the slidable member permitting the extension of the holding member to pass through the recess whereby the holding member is rendered inoperative.

3. The combination with a rotatable member; of a holding member supported for swinging movement and moving in a direction to engage the rotatable member to hold the same against rotation in one direction, said holding member being provided with an extension, a member supported for sliding movement and with which the extension of the holding member contacts to maintain the holding member in engagement with the rotatable member, said slidable member being provided with a recess, a second position of the slidable member permitting the extension of the holding member to pass through the recess whereby the holding member is rendered inoperative, the recess of the slidable member having a cam face with which the extension of the holding member engages when the holding member is moving into an inoperative position, and automatic means for imparting movement to the movable member to bring the recess of the movable member out of the path of travel.

4. The combination with a rotatable member; of a holding member supported for movement toward or from the rotatable member, said holding member to be moved into engagement with the rotatable member holding said rotatable member against rotation, a pair of interlocking members having independent movement one relative to the other, one of said members being operatively engaged with the holding member, and an expansible member operatively engaged with the last two members for constantly urging one of said members in one direction relative to the other.

5. The combination with a rotatable member; of a holding member supported for movement toward or from the rotatable member, said holding member to be moved into engagement with the rotatable member holding said rotatable member against rotation, a pair of interlocking members having independent movement one relative to the other, one of said members being operatively engaged with the holding member, and an expansible member operatively engaged with the last two members for constantly urging one of said members in one direction relative to the other, and means coacting with one of the relatively movable members for locking the holding member either in engagement with the rotatable member or free therefrom.

6. The combination with a rotatable member; of a holding member supported for swinging movement and moving in a direction to engage the rotatable member to hold the same against rotation in one direction, said holding member being provided with an extension, a member supported for sliding movement and with which the extension of the holding member contacts to maintain the holding member in engagement with the rotatable member, said slidable member being provided with a recess, a second position of the slidable member permitting the extension of the holding member to pass through the recess whereby the holding member is rendered inoperative, the recess of the slidable member having a cam face with which the extension of the holding member engages when the holding member is moving into inoperative position.

7. The combination with a rotatable member; of a holding member supported for swinging movement and moving in a direction to engage the rotatable member to hold the same against rotation in one direction, said holding member being provided with an extension, a member supported for sliding movement and with which the extension of the holding member contacts to maintain the holding member in engagement with the rotatable member, said slidable member being provided with a recess, a second position of the slidable member permitting the extension of the holding member to pass through the recess whereby the holding member is rendered inoperative, the recess of the slidable member having a cam face with which the extension of the holding member engages when the holding member is moving into inoperative position, and means for imparting movement to the slidable member to bring the recess of the slidable member out of the path of travel.

8. The combination with a rotatable member and an operating member for a reversing mechanism; of a holding member supported for swinging movement and normally moving in a direction for engagement with the rotatable member to hold the same against rotation in a reversed direction, means for normally maintaining the holding member against release from the rotatable member, and an operative connection between the operating member for the reverse and the last named means for rendering said last named means inoperative when the operating member for the reverse mechanism is moved into reverse position.

9. The combination with a rotatable member and an operating member for a reversing mechanism; of a holding member supported for swinging movement and normally moving in a direction for engagement with the rotatable member to hold the same against rotation in a reversed direction, means for normally maintaining the holding member against release from the rotatable member, an operative connection between the operating member for the reverse and the last named means for rendering said last named means inoperative when the operating member for the reverse mechanism is moved into reverse position, and means for normally maintaining the slidable member in its first position.

10. The combination with a rotatable member, of a holding member supported for movement toward or from the rotatable member, said holding member to be moved into engagement with the rotatable member holding said rotatable member against rotation, an operating member, a housing for said operating member provided with a restricted opening in one of its walls, a connection between the holding member and the operating member, said connection being disposed through the restricted opening, and means for holding the operating member against movement.

In testimony whereof I hereunto affix my signature.

WILLIAM ISIAH WHEELER.